(12) United States Patent
Houck

(10) Patent No.: US 7,264,418 B1
(45) Date of Patent: Sep. 4, 2007

(54) MODULAR SLOTTED DRAIN ASSEMBLY

(76) Inventor: Randall J. Houck, 705 Standish Dr., St. Augustine, FL (US) 32086

( * ) Notice: Subject to any disclaimer, the term of this patent is extended or adjusted under 35 U.S.C. 154(b) by 0 days.

(21) Appl. No.: 11/543,686

(22) Filed: Oct. 5, 2006

(51) Int. Cl.
E02B 11/00 (2006.01)

(52) U.S. Cl. ............... 405/43; 405/36; 405/47; 404/2; 404/4

(58) Field of Classification Search ............ 405/36, 405/43–50; 404/2, 4
See application file for complete search history.

(56) References Cited

U.S. PATENT DOCUMENTS

| 1,457,637 | A | | 6/1923 | Sievers | |
|---|---|---|---|---|---|
| 3,714,786 | A | * | 2/1973 | Evans et al. | 405/49 |
| 3,898,778 | A | * | 8/1975 | Erickson et al. | 404/2 |
| 4,273,466 | A | | 6/1981 | Trahan, Sr. et al. | |
| 4,365,911 | A | | 12/1982 | Rossberg | |
| 4,407,055 | A | * | 10/1983 | Rossberg | 29/890.14 |
| 5,380,121 | A | | 1/1995 | Schluter | |
| 5,564,857 | A | | 10/1996 | Schluter | |
| 5,908,266 | A | | 6/1999 | Miller | |
| 6,663,317 | B1 | * | 12/2003 | Williams et al. | 405/48 |
| 6,746,179 | B1 | | 6/2004 | Kerkhoff | |
| 7,008,137 | B2 | * | 3/2006 | Muller | 405/38 |
| 2005/0100412 | A1 | | 5/2005 | Houck | |

FOREIGN PATENT DOCUMENTS

GB 2263522 7/1993

OTHER PUBLICATIONS

Contech Construction Products, Inc.; Slotted Drain, pp. 1-12.
VersaDrain™, pp. 1-2.

* cited by examiner

Primary Examiner—Frederick L. Lagman
(74) Attorney, Agent, or Firm—Thomas C. Saitta

(57) ABSTRACT

A modular slotted drain assembly having a slotted drainpipe, one or more base drain members positioned in communication with the slot of the drainpipe, and one or more reducer drain members stacked atop the base drain members. The reducer drain members have non-parallel upper and lower edges, such that one end of a reducer drain member is taller than its other end. An assembly is created such that the slope of the upper edges of the reducer drain members is not parallel to the drainpipe axis, allowing the upper edges of the reducer drain members to correspond to the slope of the ground surface.

28 Claims, 4 Drawing Sheets

MODULAR SLOTTED DRAIN ASSEMBLY

BACKGROUND OF THE INVENTION

This invention relates generally to surface drains of the type used to remove accumulated or flowing water from roadways, parking lots, playing fields, runways or the like, and more particularly to surface drains often referred to as slotted drains, where an elongated drain extends from the surface to underground drainpipes, the drain mating with or received by an elongated longitudinal slot disposed in the upper portion of the drainpipe. More particularly, the invention relates to such drains where the height and/or slope of the drain can be varied or adjusted to account for the depth and/or the slope of the drainpipe relative to the surface.

It is well known to provide extensive underground conduit systems for the removal of large quantities of surface water resulting from rain or other events. Such systems are typically necessary where the natural ground surface has been altered by building, paving or the like, such that rainwater cannot be absorbed directly into the ground. A common example of such a system is a storm sewer disposed in conjunction with a roadway or parking lot. Relatively large underground conduits of concrete or plastic are interconnected to form a pathway for removal of the water. Surface mounted drains or curb inlets, often covered with grates, are positioned at intervals and connected in communicating manner to the drainpipes. One particular type of storm drain structure is known as a slotted drain. In this structure or assembly, the drain member is a generally elongated rectangular member that extends from the ground or road surface downward to the drainpipe, the drainpipe being provided with an elongated longitudinal slot to receive the slotted drain. The drain is comprised of a pair of elongated opposing side walls and two short ends walls. A plurality of spacer members or cross braces are disposed between the side walls to provide structural integrity in a manner that does not impede to any great degree water flow through the drain. The space members may be positioned so as to self-define a grate along the upper surface of the drain, or a separate surface grate member, slotted or apertured to allow passage of water while allowing the surface grate member to be walked or driven upon, is provided.

Examples of such drain systems can be seen in U.S. Pat. No. 4,365,911 to Rossberg, U.K. Published Patent Appl. No. 2,263,522 to Vitkovitch, U.S. Pat. No. 6,746,179 to Kerkhoff, U.S. Patent Appl. Publication No. 2005/0100412 to Houck, U.S. Pat. No. 5,908,266 to Miller, U.S. Pat. No. 5,380,121 to Schluter, and U.S. Pat. No. 5,564,857.

A problem associated with such systems results from the fact that the drainpipes are positioned in the ground so as to have a slight slope or incline to facilitate water flow, abut usually the slope of the ground surface does not correspond to the slope of the drainpipes. For example, over a length of ten feet the drainpipe may have a slope of three to four inches. If the ground surface is level or has a different slope than the drainpipe, the top of the drain will not correspond to the ground surface. The patents referenced above to Miller and Schluter attempt to address this problem by providing a means to adjust the slope or angle of the drain upper surface relative to the slope of the drainpipe. In Miller it is suggested to solvent weld strips of plastic to the inside of the assembly, while in Schluter the drain comprises an upper drain body and a lower drain body, one being received by the other in a telescoping or secured by bearing plates. These solutions require time and labor intensive assembly of components, and any load bearing characteristics are adversely affected by these assemblies.

It is an object of this invention to address the problem of non-parallel ground surface and drainpipe slopes by providing a modular assembly whereby components of proper configuration are chosen to address the slope inequities, the components being easily and quickly assembled without the need for time and labor intensive bonding and adjusting steps. The components are constructed so as to interlock or mate in a manner that does not adversely affect the load bearing characteristics of the assembly. The joining or mating means for the various components are uniform, such that components are generally interchangeable.

SUMMARY OF THE INVENTION

The invention is in a general a modular slotted drain assembly comprising a drainpipe having an elongated, longitudinal slot disposed in its upper portion, at least one and preferably a plurality of base drain members connecting with the elongated slot, and at least one and preferably a plurality of reducer drain members connecting with the base drain members, such that water flowing into the open tops of the reducer drain members passes through the base drain members and into the drainpipe.

The base drain members generally each comprise a pair of elongated opposing side walls rigidly joined together by a plurality of spacer or cross brace members, the spacer members being configured and disposed so as to minimally impede water flow down through the base drain member. A longitudinally extensive seating flange or shoulder member is disposed a short distance from the bottom of the side walls, defining longitudinally extensive tabs or leg members that are received by the drainpipe slot, the seating flanges being sized and configured to rest on the outer surface of the drainpipe.

The reducer drain members generally each comprise a pair of elongated opposing walls rigidly joined together by a plurality of spacer or cross brace members, the spacer members being configured and disposed so as to minimally impede water flow down through the reducer drain member. The height of the side walls at a first end is greater than the height of the side walls at the second end, such that the upper and lower edges of each side wall are not parallel. Aggregate retention members, such as a grate, may be disposed within or beneath the reducer drain members to retain rocks, gravel, rubber or synthetic particles or the like for filtering purposes.

Mating means are provided to connect the reducer drain members to and above the base drain members. In a preferred embodiment the upper edges of the side walls of the base drain members and the lower edges of the side walls of the reducer drain members are joined using a mated rabbet or shiplapped joint. The upper edges of the reducer drain members are also provided with a corresponding rabbet, such that multiple reducer drain members may be vertically stacked to increase the height of the drain assembly. An apertured or slotted surface grate member may be retained by the upper rabbets of the uppermost reducer drain members to partially obstruct the drain opening. The modular drain assembly provides for excellent load bearing properties, such that pedestrian and vehicular traffic is easily supported.

The drain assembly comprises at least one base drain member connected in communicating manner to the elongated slot of a drainpipe, with at least one reducer drain member mounted atop the base drain member and connected in communicating manner thereto, such that water may pass through the reducer drain members and base drain members and into the drainpipe. In order to account for the difference in slope between the ground surface and the drainpipe, reducer drain members of proper reduction ration are used to translate the slope of the drainpipe into the slope of the ground surface.

DETAILED DESCRIPTION OF THE INVENTION

Figure 1:
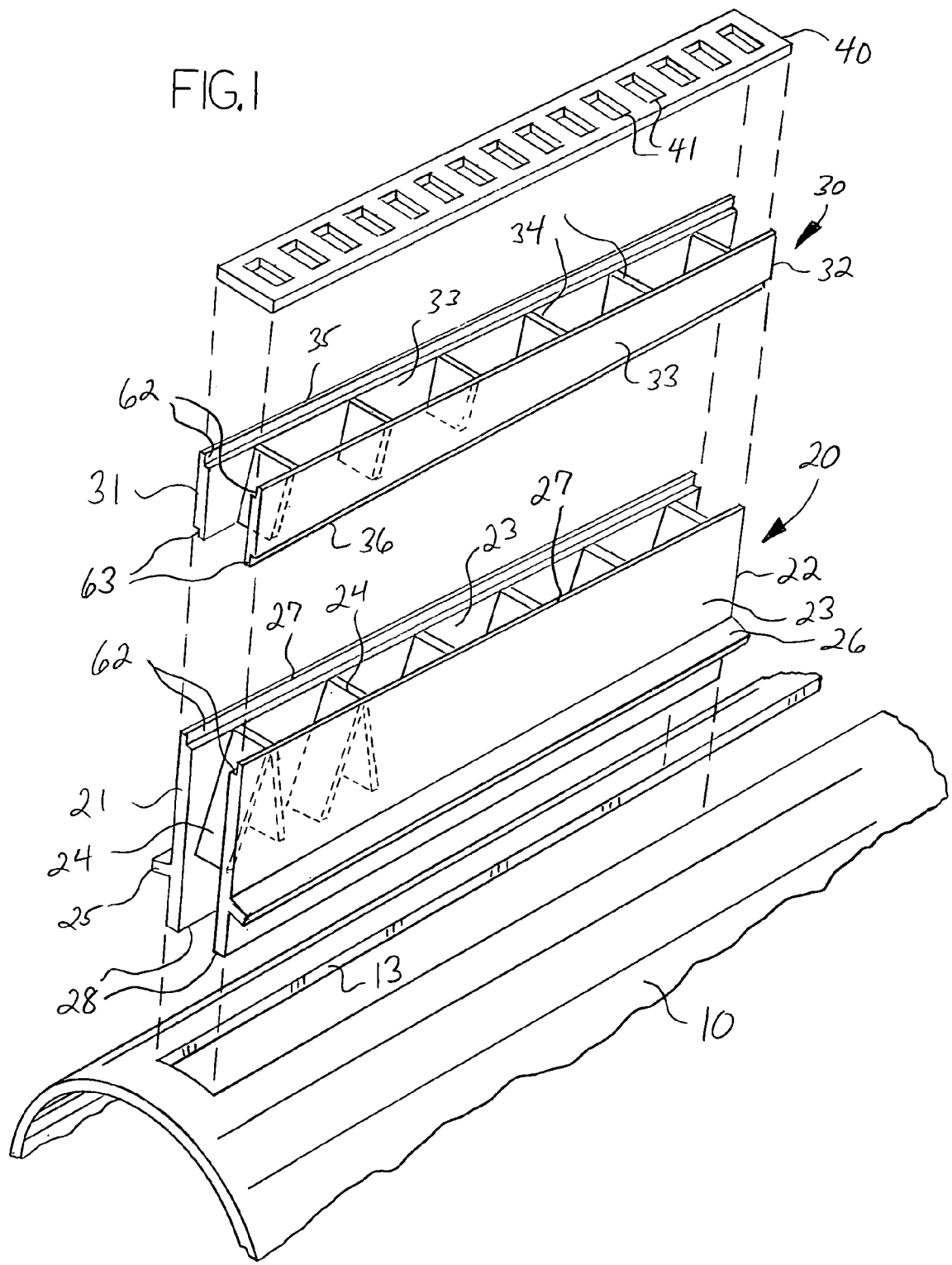
FIG. 1 is an exploded perspective view showing the drainpipe, base drain member, reducer drain member and surface grate member.

With reference to the drawings, the invention will now be described in detail with regard for the best mode and the preferred embodiment. In general, the invention is a modular slotted drain assembly comprising at least one and preferably multiple drainpipes 10, at least one and preferably multiple base drain members 20, and at least one and preferably multiple reducer drain members 30, connected in a generally vertical, stacked orientation with the base drain member 20 mounted atop the drainpipe 10 and the reducer drain member 30 mounted atop the base drain member 20. The reducer drain members 30 are structured with non-parallel upper edges 35 and lower edges 36, such that a reduction ratio is defined whereby through selection of reducer drain members 30 having proper reduction ratios, the incline or slope of the drainpipe 10 is translated so that the slope of the upper edges 36 of the uppermost reducer drain members 30 are parallel to the slope of the ground surface 99, the slope of the upper edges 36 being defined herein to represent the line or plane defined by the upper edges 36.

Drainpipes 10 are of generally conventional construction and composed of typical material such as concrete, plastic, fiberglass, etc. The drainpipe 10 may be provided with a flared or expanded female open end 11 and a non-flared male open end 12, whereby plural drainpipes 10 may be easily joined in end-to-end relation in known manner. The drainpipe 10 is provided with an elongated, longitudinally oriented, slot member 13, generally rectangular in configuration and having opposing side walls that are parallel. The slot member 13 passes completely through the wall of the drainpipe 10. When positioned in the ground, the drainpipe 10 is oriented such that the slot member 13 is uppermost. Most preferably the slot member 13 does not extend fully to either end of the drainpipe 10.

Figure 2:
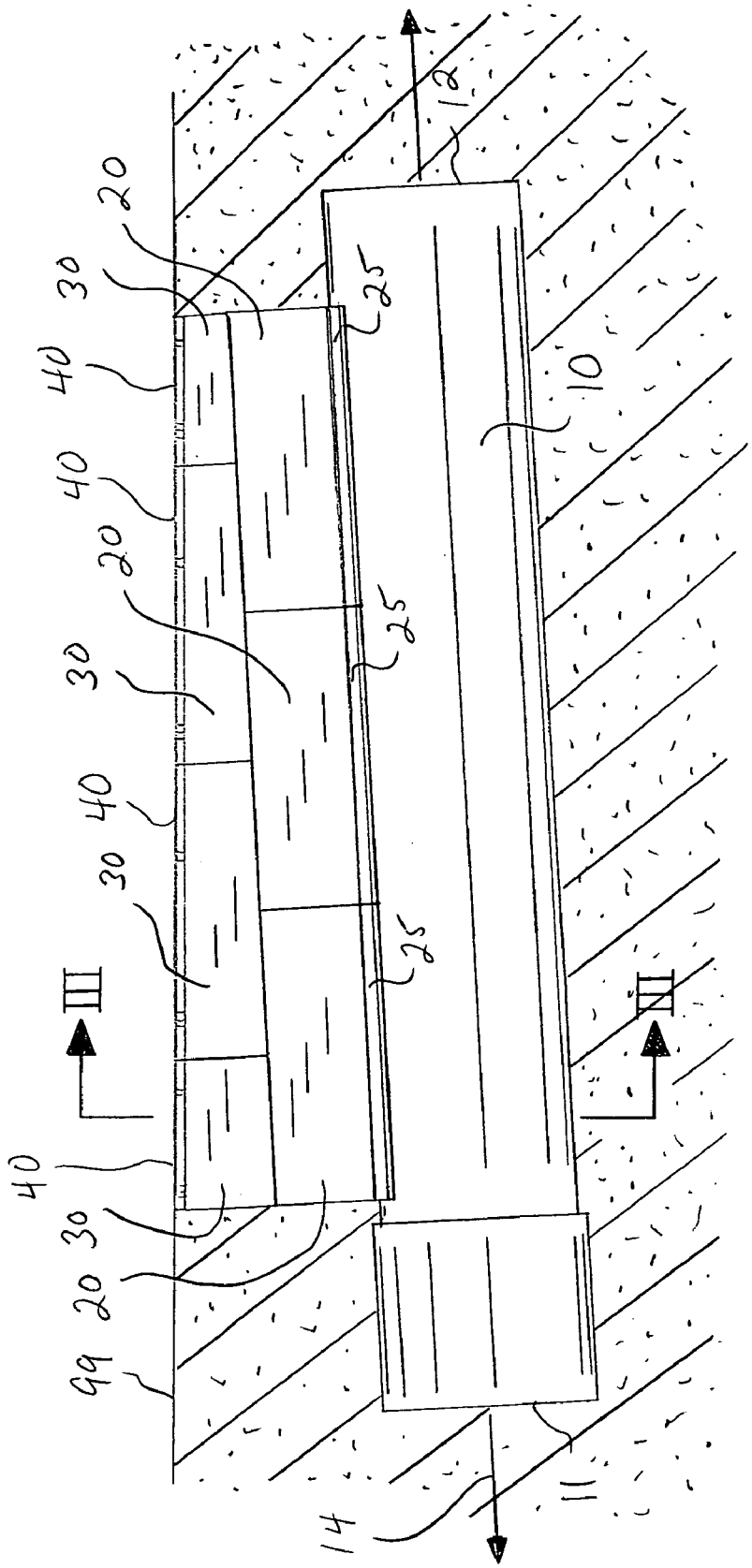
FIG. 2 is a side view of the modular slotted drain assembly disposed in the ground, wherein the drain reducer members account for the slope of the drainpipe relative to the slope of the ground surface.

The drain assembly defines the conduit for passage of water from the ground surface 99 through slot member 13 and down into the drainpipe 10 for removal. The drain assembly is comprised of the combination of at least one base drain member 20 and at least one reducer drain member 30, and typically will comprise the combination of plural base drain members 20 and plural reducer drain members 30, as shown in FIG. 2. The reducer drain members 30 may be disposed on the base drain members 20 such that the reducer drain members 30 overlap the ends 21 and 22 of the base drain members 20, as shown in FIG. 2, or reducer drain member ends 31 and 32 may be aligned with the base drain member ends 21 and 22, as shown in FIG. 1.

The base drain members 20 comprise a pair of longitudinally extensive, opposing side walls 23 having a first end 21 and a second end 22. The side walls 23 are connected together in rigid manner by cross braces or spacer members 24. Opposing side walls 23 are preferably fixed in parallel as shown in the figures, or they may be oriented so as to converge or diverge vertically. The spacer members 24 may comprise any suitably strong and rigid members to span the distance between the side walls 23, such as plate members, rods, sinusoidal sheets or the like, but they should be sized and disposed so as to minimize interference with vertical water flow through the base drain member 20. The ends 21 and 22 may be open as shown, closed or provided with a cap member. Drainpipe seating means are provided for mating or connecting the base drain member 20 to the drainpipe 10, preferably comprising a longitudinally extending seating flange 25, either continuous or segmented, extending outwardly along each side wall 23, preferably on the lower half of the base drain member 10. The seating flanges 25 define the lower portion of each side wall 23 as insertion tab members or flanges 26, with the separation distance between the two insertion flanges 26 being such that they may be generally snugly inserted into slot member 13. In this manner the base drain members 20 are received through the slot member 13 with the underside of the seating flanges 25 bearing upon the upper outer surface of the drainpipe 13 to either side of the slot member 13 to support the base drain member in a generally vertical orientation, with the lower edges 28 and insertion flanges 26 extending only a short distance into the drainpipe 10 so as to minimize interference with water flow. For ease of assembly the base drain members 20 are preferably of shorter length than the slot member 13, such that a plurality of base drain members 20 abutted end-to-end are required to fill the slot member 13. Connector means, bonding, welding or the like, may be utilized to secure the base drain members 20 together in the axial direction. As a representative example, not meant to be limiting, a suitable base drain member 20 may be composed of plastic, metal or other material of suitable strength, rigidity and durability, having a length of approximately three feet, a height of approximately nine inches and a width of approximately three inches. The seating flanges 25 may be angled slightly downward and extend outwardly approximately one inch, with the seating flanges 26 positioned approximately six inches from the upper edge 27 such that the insertion flanges 25 are approximately two and one half inches in height.

The reducer drain members 30 comprise a pair of longitudinally extensive, opposing side walls 33 having a first end 31 and a second end 32. The side walls 33 are connected together in rigid manner by cross braces or spacer members 34. Opposing side walls 33 are preferably fixed in parallel as shown in the figures. The spacer members 34 may comprise any suitably strong and rigid members to span the distance between the side walls 33, such as plate members, rods, sinusoidal sheets or the like, but they should be sized and disposed so as to minimize interference with water flow through the reducer drain member 30. The ends 31 and 32 may be open as shown, closed or provided with a cap member. For ease of assembly the reducer drain members 30 are preferably of shorter length than the slot member 13, such that a plurality of reducer drain members 30 abutted end-to-end are required to match the full length the base drain members 20. Connector means 50, such as shown in FIG. 5, bonding, welding or the like, may be utilized to secure the reducer drain members 30 together in the axial direction. As a representative example and not meant to be limiting, a suitable reducer drain member 30 may be composed of plastic, metal or other material of suitable strength, rigidity and durability, having a length of approximately three feet and a width of approximately three inches.

The height of the reducer drain member 30 diminishes from the first end 31 to the second end 32, such that the upper edges 35 of the side walls 33 are not parallel to the lower edges 36 of the side walls 33. This structure enables adjustment of the slope of the upper edges 35 relative to the slope of the upper edges 27 of the base drain members 20 and the slope of the drainpipe 10. As shown in FIG. 2, by selection of reducer drain members 30 having the proper reduction ratio, the downward slope of the longitudinal axis 14 of the drainpipe 10 is converted into a horizontal slope corresponding or parallel to the slope of the ground surface 99. For example and not meant to be limiting, a set of reducer drain members 30 may be provided with each reducer drain member having a reduction of one inch over its length, such as a first reducer drain member 30 having a first end 31 height of six inches and a second end 32 height of five inches, a reduction ratio of 6:5, a second reducer drain member 30 having a first end 31 height of five inches and a second end 32 height of four inches, a reduction ratio of 5:4, and a third reducer drain member 30 having a first end 31 height of four inches and a second end 32 height of three inches, a reduction ratio of 4:3. When these three reducer drain members 30 are abutted end to end, the three inch slope of the drainpipe 10 is converted to a horizontal slope. In practice, reducer drain members 30 having greater or lesser reduction ratios may be provided, or multiple reducer members 30 may be stacked atop one another to vary the reduction ratio as required by a particular circumstance, such as for example an non-horizontal slope for the ground surface 99.

Figure 3:
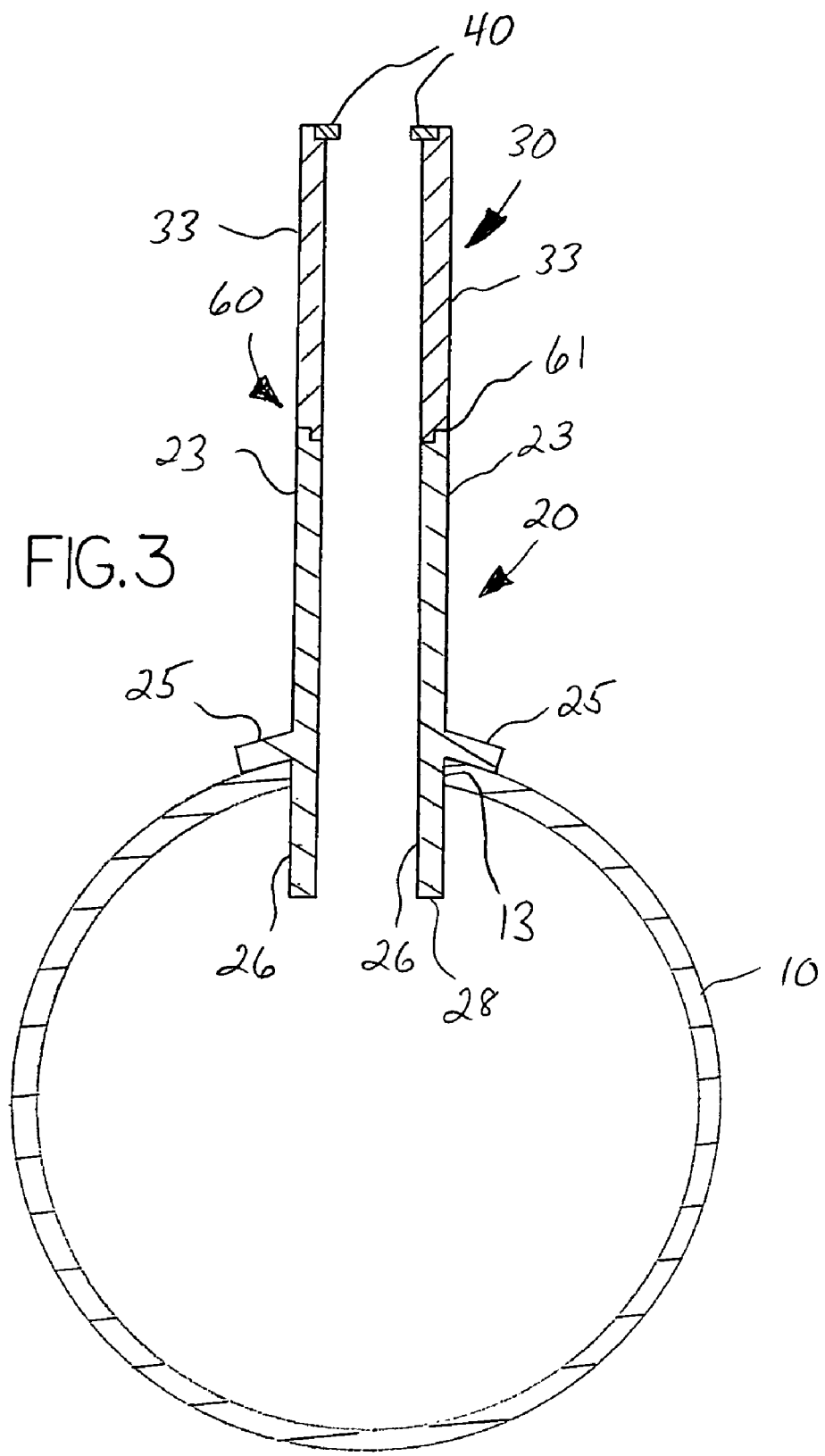
FIG. 3 is a cross-sectional end view taken along line III-III of FIG. 2, showing the drainpipe, base drain member, reducer drain member and grate member.
Figure 4:
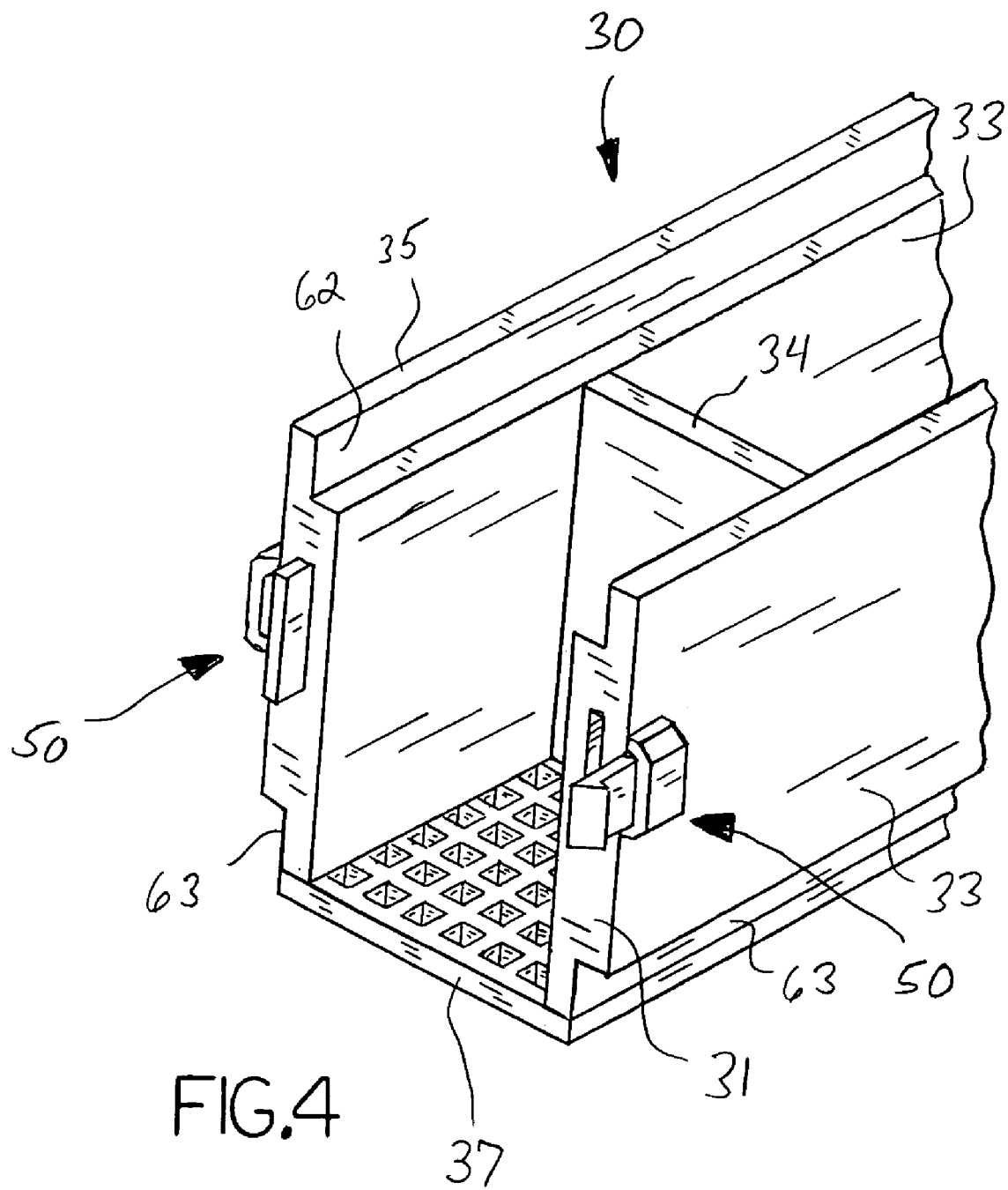
FIG. 4 is a partial perspective view of the end of a reducer drain member, showing an optional end connection means for joining multiple reducer drain members and an aggregate retention member.

While the reducer drain members 30 may be set directly upon the base drain members 20 with the side walls 33 aligned with the side walls 23 and then bonded, welded or mechanically fastened in place, the preferred construction comprises edge connection means 60 such that the reducer drain members 30 are easily and quickly joined to the base drain members 20 yet are securely received and retained thereon. For example and not meant to be limiting, the edge connection means 60 may comprise simple mechanical interlocking structures such as a mating batten or shiplapped joint 61. In a mating batten joint, a first recess 62 is created on an upper edge 27 and a second opposing recess 63 is created on a lower edge 36 to be joined, such that when the recesses 62 and 63 are mated the side walls 23 and 33 are properly aligned, as shown best in FIG. 3. Preferably, a recess 62 is also created on upper edge 35 of the reducer drain member 30, as this allows a second reducer drain member 30 to be aligned atop the first reducer drain member 30 if needed. In addition, the recess 62 on the upper edge 35 of reducer drain member 30 defines a shoulder to receive a surface grate member 40 having apertures or slots 41 to allow passage of water.

In a preferred embodiment, aggregate retention members 37 are provided as part of or connected to the base drain members 20 and/or the reducer drain members 30, or are sandwiched between the base drain members 20 and the reducer members 30, the aggregate retention members 37 comprising a grate, screen, mesh, slotted sheet material or the like, the openings through which are sufficiently small so as to retain filter or supportive aggregate material within the base drain members 20 and/or the reducer members 30. The aggregate material may comprise any suitable material used in the art, such as for example rocks, gravel, pebbles, rubber or synthetic particles, or the like.

Preferably, the materials of composition for the drainpipe 10, the base drain members 20, the reducer drain members 30 and the surface grate member 40 are of sufficient strength so as to be load bearing, and most preferably are capable of an H-10 load rating such that even large trucks may be driven over the assembly.

In use the drainpipe 10 is disposed in the ground such that its longitudinal axis 14 is at a non-horizontal desired slope to insure that water flows through the drainpipe 10 rather than pooling. The base drain members 20 are then positioned so as to communicate with the slot member 13. Reducer drain members 30 having the proper height and reduction ratio are then chosen and vertically stacked onto the base drain members 30, such that the upper edges 35 of the reducer drain members 30 are non-parallel to the drainpipe axis 14. The taller ends 31 of the reducer drain members 30 are positioned to the lower side of the drainpipe axis 14 to level off the slope, such that the upper edges 35 are approximately even with or slightly below a horizontal ground surface 99 and parallel thereto. If the drainpipe 10 is too deep for a single row of reducer drain members 30 to accomplish this purpose, multiple rows of reducer members 30 may be utilized to obtain the proper height. In similar manner, if the ground surface 99 is not horizontal, proper combinations of reducer drain members 30 of differing reduction ratios can be utilized to provide the uppermost upper edges 35 with the proper slope to match the non-horizontal slope of the ground surface 99.

It is understood that equivalents and substitutions for certain elements and structure set forth above may be obvious to those skilled in the art, and therefore the true scope and definition of the invention is to be as set forth in the following claims.

I claim:

1. A modular slotted drain assembly comprising in combination:
    at least one drainpipe having a longitudinal slot member and a longitudinal axis;
    at least one base drain member communicating with said slot member, said at least one base drain member comprising side walls, spacer members connecting said side walls, and drainpipe seating means connecting said at least one base drain member to said at least one drainpipe;
    at least one reducer drain member connected to said at least one base drain member in a stacked manner, said at least one reducer drain member comprising side walls, spacer members connecting said side walls, said side walls each having an upper edge, a lower edge, a first end and a second end, wherein said upper edges are non-parallel to said lower edges and said first ends are taller than said second ends.

2. The assembly of claim 1, further comprising a surface grate member connected to said at least one reducer drain member.

3. The assembly of claim 1, wherein said drainpipe seating means comprises a seating flange disposed on each of said base drain member side walls.

4. The assembly of claim 3, said at least one base drain member further comprising insertion flanges, wherein said insertion flanges are disposed within said slot member.

5. The assembly of claim 1, further comprising edge connection means connecting said at least one reducer drain member lower edges to said at least one base drain member.

6. The assembly of claim 5, said edge connection means comprising mating batten joints.

7. The assembly of claim 1, wherein said at least one drainpipe has a longitudinal axis, and wherein said upper edges of said at least one reducer member are non-parallel to said axis.

8. The assembly of claim 1, further comprising an aggregate retention member.

9. The assembly of claim 1, wherein said upper edges of said at least one reducer member define a slope non-parallel to said drainpipe longitudinal axis.

10. A modular slotted drain assembly comprising in combination:
at least one drainpipe having a longitudinal slot member and a longitudinal axis;
base drain members communicating with said slot member, said base drain members aligned in an end-to-end manner, said base drain members each comprising side walls, spacer members connecting said side walls, and drainpipe seating means connecting said base drain members to said at least one drainpipe;
reducer drain members connected atop said base drain members in a stacked manner, said reducer drain members aligned in an end-to-end manner, said reducer drain members each comprising side walls, spacer members connecting said side walls, said side walls each having an upper edge, a lower edge, a first end and a second end, wherein said upper edges are non-parallel to said lower edges and said first ends are taller than said second ends.

11. The assembly of claim 10, further comprising a surface grate member connected atop said reducer drain members.

12. The assembly of claim 10, wherein said drainpipe seating means comprises a seating flange disposed on each of said base drain member side walls.

13. The assembly of claim 12, said base drain members further comprising insertion flanges, wherein said insertion flanges are disposed within said slot member.

14. The assembly of claim 10, further comprising edge connection means connecting said reducer drain member lower edges to said base drain members.

15. The assembly of claim 14, said edge connection means comprising mating batten joints.

16. The assembly of claim 10, wherein said at least one drainpipe has a longitudinal axis, and wherein said upper edges of said reducer members are non-parallel to said axis.

17. The assembly of claim 10, wherein said reducer drain members are disposed in multiple layers atop said base drain members.

18. The assembly of claim 10, wherein said base drain members each further comprises a first end and second end, and wherein said reducer drain members overlap said first ends and said second ends of abutting said base drain members.

19. The assembly of claim 10, wherein said base drain members each further comprises a first end and second end, and wherein said first ends and second ends of said reducer drain members align with said first ends and said second ends of said base drain members.

20. The assembly of claim 10, wherein said reducer drain members have different reduction ratios.

21. The assembly of claim 20, wherein said reducer drain members have different heights.

22. The assembly of claim 10, wherein any of said reducer drain members are connectable to any of said base drain members.

23. The assembly of claim 10, further comprising an aggregate retention member.

24. The assembly of claim 10, wherein said upper edges of said at least one reducer member define a slope non-parallel to said drainpipe longitudinal axis.

25. A method of installing a modular slotted drain assembly providing a means to remove water from a ground surface having a defined surface slope, comprising the steps of:
positioning at least one drainpipe underground, said drainpipe having a longitudinal axis and a longitudinal slot member oriented in an uppermost disposition, said drainpipe being inclined such that said longitudinal axis is non-horizontal to facilitate flow of water through said drainpipe;
connecting base drain members in fluid communicating manner to said slot member, said base drain members aligned in an end-to-end manner, said base drain members each comprising side walls, spacer members connecting said side walls, and drainpipe seating means connecting said base drain members to said at least one drainpipe;
connecting reducer drain members atop said base drain members in a stacked manner, said reducer drain members aligned in an end-to-end manner, said reducer drain members each comprising side walls, spacer members connecting said side walls, said side walls each having an upper edge, a lower edge, a first end and a second end, wherein said upper edges are non-parallel to said lower edges and said first ends are taller than said second ends;
wherein said reducer drain members are selected such that after connection to said base drain members the upper edges of said reducer drain members are non-parallel to said longitudinal axis of said at least one drainpipe.

26. The method of claim 25, further wherein said reducer drain members are selected such that after connection to said base drain members the upper edges of said reducer drain members are parallel to said defined surface slope of said ground surface.

27. The method of claim 26, further wherein said reducer drain members are selected such that after connection to said base drain members the upper edges of said reducer drain members are even with said defined surface slope of said ground surface.

28. The method of claim 25, further comprising stacking reducer drain members atop other reducer drain members to define multiple rows of reducer drain members.

* * * * *